United States Patent Office 3,405,204
Patented Oct. 8, 1968

3,405,204
PROCESS OF VULCANIZING WITH AMMONIA A CHLOROSULFONATED POLYETHYLENE COATING CONTAINING AN ACTIVE METAL OXIDE
Charles E. McCormack, Wilmington, Del., assignor to E. I. du Pont de Nemours and Company, Wilmington, Del., a corporation of Delaware
No Drawing. Filed July 23, 1964, Ser. No. 384,807
4 Claims. (Cl. 264—83)

This invention relates to a process of vulcanizing a chlorosulfonated polyethylene covering over a conductor.

Various types of wire for automotive and building uses are made from metal conductors covered with thermoplastic insulating materials such as polyvinylchloride or polyethylene. These thermoplastic coverings are very desirable because of low cost, e.g., they can be applied rapidly over the conductor by simple, efficient, high-speed extrusion techniques. To apply the thermoplastic coverings, it is only necessary to heat the plastic in the extruder to the softening point, extrude over the conductor, and cool the structure to the point where the plastic hardens and develops toughness.

During severe service, however, some types of the plastic covered wire may again be exposed to heat near its softening point, and by its nature, the plastic resoftens and sometimes flows off the conductor, leaving it exposed.

Cross-linked (or vulcanized) polymeric coverings are known to overcome this difficulty of melting and flowing which occurs with the thermoplastic coverings. Among the preferred vulcanized coverings for conductors are elastomeric compositions containing chlorosulfonated polyethylene. These are highly desirable because they do not flow or melt when exposed to severe heat, and they have excellent resistance to weather, oil, and ozone which properties are often needed in automotive and building uses. However, the method of vulcanization has generally involved the use of high temperatures and pressures, e.g., as with treatment with steam at over 200 p.s.i.g. Further, heat-vulcanizable compositions contain chemical vulcanizing agents and the presence of these during the period when the compositions are being extruded on the wires at temperatures where good flow is to be obtained can cause premature curing and hinder the successful coating of the conductor.

In accordance with this invention it has been found that a conductor covered with an uncured chlorosulfonated polyethylene composition can be vulcanized even at room temperature by contacting the coated conductor with ammonia below about 100° C. until substantial cross-linking of the coating occurs.

The process of this invention involves compositions containing chlorosulfonated polyethylene; the latter can be prepared as described in U.S. Patents 2,416,060 and 2,586,363, i.e., polymers with a chlorine content within the range of about 25 to 37% and sulfur content within the range of 0.4 to 3.0%. The compositions may contain the known chemical vulcanizing agents which promote the vulcanization of chlorosulfonated polyethylene during heating; however, in the chlorosulfonated polyethylene compositions used in this invention, it is preferred to omit the organic chemicals used for vulcanizing with heat, but to retain the metal oxides such as magnesia or litharge. The elimination of these vulcanizing chemicals is desirable not only for economy, but it also is useful since it permits the chlorosulfonated polyethylene compositions to be processed for prolonged periods at high temperatures without excessive cross-linking. Thus, processability in the unvulcanized state is similar to the processing of conventional thermoplastic resin compositions.

In operating the improved process of the invention, the compositions containing chlorosulfonated polyethylene are prepared by conventional mixing methods well-known to those skilled in the art. After mixing, the compositions are applied around the metal conductor by well-known processes such as wrapping or extruding. Extruders are preferred for applying the covering because they are fast and efficient. When extruders are used, it is preferred to maintain the chlorosulfonated polyethylene compositions within the range of 100° to 150° C. where good flow around the conductor is obtained.

After the conductor is covered with a chlorosulfonated polyethylene composition, the structure may be immersed in a bath of aqueous ammonia to promote cross-linking. The concentration of ammonia in the bath is not critical, but solutions containing from about 15 to 28% $NH_3$ by weight are preferred; such solutions provide an adequate supply of ammonia for a sustained period of treatment.

The uncured conductor may be subjected to ammonia gas instead of aqueous ammonia. In such treatment, the coated conductor is enclosed in a pressure vessel and ammonia gas is introduced, preferably above atmospheric pressure, e.g., up to about 10 p.s.i.g.

The time of treatment of the conductor structure with ammonia is critical with regard to the amount of cross-linking developed. At room temperature, an exposure of about 4 hours is minimum, while an exposure longer than about 24 hours may be uneconomical. At higher temperatures, the treatment can be shortened, and at about 100° C. an exposure of 15 minutes to 1 hour may suffice for cross-linking. If shorter curing times are desired, it is recommended that ammonia gas be used or ammonia solutions containing about 25 to 28% $NH_3$ by weight (i.e., commercial concentrated ammonia). If temperatures above room temperature are used, it is advisable to enclose the treating bath to prevent the escape of ammonia.

The invention will now be described with reference to the following examples of specific embodiments thereof wherein parts and percentages are by weight unless otherwise specified.

EXAMPLE I

A chlorosulfonated polyethylene composition is prepared by milling the following ingredients together on a cool two-roll rubber mill according to the proportions below.

| | |
|---|---|
| Chlorosulfonated polyethylene containing 35% chlorine and 1% sulfur | 100 |
| Extra light calcined magnesium oxide | 20 |
| Hard clay | 180 |
| Titanium dioxide | 1 |
| Organic Green pigment | 2 |
| Processing oil | 20 |
| Butyl oleate | 20 |
| Wax blend of parraffin wax and microcrystalline wax | 3 |
| Stearic acid | 2 |

The composition is extruded at a temperature of about 125° C. from a "Royle" 2" extruder equipped with a cross-head attachment for covering wire. A No. 18 AWG stranded, tinned copper conductor is uniformly covered with a layer of the composition at a nominal thickness of 0.028 inch. Sections of the covered conductor are immersed in commercial concentrated aqueous ammonia solution for 24 hours at room temperature. About 24 hours after removal from the ammonia bath, the covering is stripped from the conductor and the stress-strain properties are measured at room temperature. The covering has a tensile strength of 2200 pounds per square inch and an elongation at break of 220%.

When a control composition is tested without having the immersion treatment in aqueous ammonia, the tensile strength is only about 500 pounds per square inch and the elongation at break about 400%.

EXAMPLE II

A chlorosulfonated polyethylene composition is prepared by mixing the following ingredients together on a cool two-roll rubber mill according to the proportions below.

| | |
|---|---|
| Chlorosulfonated polyethylene of Example I | 100 |
| Extra light calcined magnesium oxide | 20 |
| Titanium dioxide | 20 |
| Hard clay | 60 |
| Precipitated silica | 25 |
| Processing oil | 30 |
| Petrolatum | 3 |
| Wax blend of paraffin wax and microcrystalline wax | 2 |
| Stearic acid | 2 |
| Pentaerythritol | 3 |
| Dipentamethylenethiuram tetrasulfide | 2 |

The composition is extruded at a temperature of about 125° C. from a "Royle" 2″ extruder equipped with a cross-head attachment for covering wire. A No. 16 AWG stranded copper conductor is uniformly covered with a layer of the composition at a nominal thickness of 0.022 inch. Sections of the covered conductor are treated as indicated in the table below and then tested for abrasion resistance determined according to the method of U.S. Military Specification designation: MIL–T5438, using a 10/0–400 garnet coated paper, and a 1¼ pound weight. The numbers show the lengths (inches) of abrasive tape required to abrade through the chlorosulfonated polyethylene covering to the conductor.

Table

| Treatment: | Abrasion resistance |
|---|---|
| (1) None (wire as prepared) | 30 |
| (2) Immersed in 28% NH₄OH at room temperature for: | |
| 5 minutes | 30 |
| 1 hour | 33 |
| 24 hours | 63 |

Thus, it can be seen that a coated wire vulcanized in accordance with this invention has a high abrasion resistance.

EXAMPLE III

A chlorosulfonated polyethylene composition is prepared according to the procedures of Example I execpt the 20 parts of magnesium oxide is replaced with 25 parts of litharge. The composition is processed and tested as described in Example I. The covering has a tensile strength of 2000 pounds per square inch and an elongation at break of 320%.

EXAMPLE IV

A chlorosulfonated polyethylene composition is prepared by milling the following ingredients together on a cool two-roll rubber mill according to the proportions below:

| | |
|---|---|
| Chlorosulfonated polyethylene (containing 35% chlorine and 1% sulfur) | 100 |
| Furnace carbon black (fast extrusion type) | 5 |
| Medium thermal carbon black | 20 |
| Processing oil | 10 |
| Polymerized aromatic petroleum resin | 20 |
| Calcined clay | 45 |
| Petrolatum | 3 |
| Blend of parrafin wax and microcrystalline wax | 2 |
| Nickel dibutyldithiocarbamate | 3 |
| Litharge | 40 |

The composition is extruded at a temperature of about 125° C. from a "Royle" 2″ extruder equipped with a cross-head attachment for covering wire. A No. 14 AWG tinned solid copper conductor is uniformly covered with a layer of the composition at a nominal thickness of 0.047 inch. Sections of the covered conductor are placed in a pressure vessel equipped with a pressure gauge, and appropriate valves for the in and out-flow of gas. Ammonia gas is introduced into the vessel at room temperature until a pressure of 10 p.s.i.g. is developed. The structure sections are held under this pressure for 4 hours or 24 hours at which times pressure is released, and sections are removed for test. About 2 days after removal from the pressure vessel, the covering is stripped from the conductor sections and the following stress-strain properties are measured at room temperature.

| | Section A | Section B |
|---|---|---|
| Time of treatment, hours | 4 | 24 |
| Stress at 200% elongation, p.s.i. | 625 | 1,200 |
| Tensile strength at break, p.s.i. | 1,425 | 2,275 |
| Elongation at break, percent | 470 | 460 |

In another test, a section is prepared and treated with ammonia for 4 hours according to the procedure described above, except the ammonia gas pressure is 20 p.s.i.g. instead of 10 p.s.i. The results are nearly identical to those shown under Section A.

While the above embodiments of the process of the invention involves immersion of the conductor structure in aqueous ammonia or treatment with ammonia gas, the conductor structure can also be exposed to the vapors above the aqueous ammonia solution with equally satisfactory results regarding cross-linking of the chlorosulfonated polyethylene compositions.

While the process of this invention is highly desirable for the production of conductors covered with chlorosulfonated polyethylene compositions, it is also useful for the production of a variety of products such as films, extruded shapes, waterproof footwear, raincoats, and tank linings and particularly where the composition must be subjected to fairly high temperatures during a fabrication period followed by vulcanization.

In the process of the present invention ammonia has been found to be surprisingly more effective than aqueous solutions of amines such as, for example, n-butylamine, diethylamine and triethylamine, in promoting cross-linking more uniformly throughout the cross-sectional area of the covering. The amines appear to promote cross-linking faster at the outer surface of the covering than at the inner surface surrounding the conductor.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a process which comprises covering a conductor with an uncured chlorosulfonated polyethylene composition having a chlorine content from 25 to 37% and a sulfur content from 0.4 to 3.0% and containing an active metal oxide, and vulcanizing said composition, the improvement in said vulcanization step of contacting said coated conductor with ammonia at a temperature below about 100° C. until substantial cross-linking of said composition occurs.

2. A process as defined in claim 1 wherein said contacting step is conducted for a period of at least 15 minutes at a temperature of about 20° to 100° C.

3. A process as defined in claim 1 wherein said coated conductor is immersed in an aqueous solution containing from about 15 to 28 percent ammonia by weight.

4. A process as defined in claim 1 wherein said coated conductor is contacted with ammonia gas.

References Cited

UNITED STATES PATENTS

| | | | |
|---|---|---|---|
| 2,322,483 | 6/1943 | Stricklen | 264—83 |
| 2,458,841 | 1/1949 | Elmore et al. | 260—79.3 |
| 2,586,363 | 2/1952 | McAlevy | 260—79.3 |
| 2,615,000 | 10/1952 | Bradley | 260—79.3 |
| 3,050,503 | 8/1962 | Natta | 260—79.3 |
| 3,288,762 | 11/1966 | Maynard | 260—79.3 |
| 3,288,763 | 11/1966 | Waldron | 260—79.3 |

JAMES A. SEIDLECK, *Primary Examiner.*

ALEXANDER H. BRODMERKEL, *Examiner.*

A. KOECKERT, *Assistant Examiner.*